(12) United States Patent
Lee et al.

(10) Patent No.: US 11,037,306 B2
(45) Date of Patent: Jun. 15, 2021

(54) EGO MOTION ESTIMATION METHOD AND APPARATUS

(71) Applicants: Samsung Electronics Co., Ltd., Suwon-si (KR); SNU R&DB Foundation, Seoul (KR)

(72) Inventors: Wonhee Lee, Yongin-si (KR); Sangil Lee, Seoul (KR); Hyoun Jin Kim, Seoul (KR); SungHoon Hong, Hwaseong-si (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 233 days.

(21) Appl. No.: 16/238,068

(22) Filed: Jan. 2, 2019

(65) Prior Publication Data

US 2020/0051253 A1    Feb. 13, 2020

(30) Foreign Application Priority Data

Aug. 7, 2018   (KR) .......................... 10-2018-0091944

(51) Int. Cl.
| | | |
|---|---|---|
| *G06T 7/246* | (2017.01) | |
| *G06T 7/10* | (2017.01) | |
| *G06T 7/521* | (2017.01) | |
| *G06F 17/18* | (2006.01) | |

(Continued)

(52) U.S. Cl.
CPC .............. *G06T 7/248* (2017.01); *G06F 17/18* (2013.01); *G06K 9/00791* (2013.01); *G06K 9/6218* (2013.01); *G06K 9/6267* (2013.01); *G06T 7/10* (2017.01); *G06T 7/521* (2017.01); *G06T 2207/10024* (2013.01); *G06T 2207/10028* (2013.01); *G06T 2207/20021* (2013.01); *G06T 2207/30252* (2013.01)

(58) Field of Classification Search
CPC ..... G06T 7/248; G06T 9/00791; G06T 7/521; G06K 9/6267; G06K 6/218; G06F 17/18
See application file for complete search history.

(56) References Cited

U.S. PATENT DOCUMENTS

| 8,213,706 B2 | 7/2012 | Krishnaswamy et al. |
| 10,408,638 B2 * | 9/2019 | Berntorp ................ G01C 25/00 |

(Continued)

FOREIGN PATENT DOCUMENTS

| JP | 2017-220020 A | 12/2017 |
| KR | 10-2015-0079098 A | 7/2015 |

OTHER PUBLICATIONS

Vogel, Christoph, et al., "3D Scene Flow Estimation with a Piecewise Rigid Scene Model." *International Journal of Computer Vision*, vol. 115, Issue 1, Feb. 24, 2015 (pp. 1-28).

(Continued)

*Primary Examiner* — Kevin Ky
(74) *Attorney, Agent, or Firm* — NSIP Law (57) ABSTRACT

Disclosed is an ego motion estimation method and apparatus, wherein the apparatus calculates a scene flow field from a plurality of spaces of an input image, clusters the plurality of spaces based on a scene flow, updates a probability vector map for clustered spaces, identifies a stationary background based on the updated probability vector map, and estimates ego motion information based on the identified stationary background.

23 Claims, 7 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 2011/0206236 A1* | 8/2011 | Center, Jr. | G06T 7/579 382/103 |
| 2015/0086078 A1* | 3/2015 | Sibiryakov | G06T 7/262 382/104 |
| 2018/0082132 A1* | 3/2018 | Spampinato | G06K 9/00805 |
| 2018/0268237 A1* | 9/2018 | Stanimirovic | G06K 9/2018 |
| 2018/0300560 A1* | 10/2018 | Westerhoff | G06T 7/579 |

OTHER PUBLICATIONS

Jaimez, Mariano et al., "Fast Odometry and Scene Flow from RGB-D Cameras based on Geometric Clustering", *2017 IEEE International Conference on Robotics and Automation (ICRA)*, 2017 (pp. 3992-3999).
Taniai, Tatsunori et al., "Fast Multi-frame Stereo Scene Flow with Motion Segmentation", *2017 IEEE Conference on Computer Vision and Pattern Recognition (CVPR)*, 2017 (pp. 6891-6900).
Starkov, Sergey et al., "Moving Object Detection in Video Streams Received from a Moving Camera", *AIST (Supplement)*, 2014 (pp. 59-63).
Lee, Sangil et al., "Real-time Rigid Motion Segmentation using Grid-based Optical Flow", *2017 IEEE International Conference on Systems, Man, and Cybernetics (SMC)*, 2017 (pp. 1552-1557).
Wulff, Jonas et al., "Optical Flow in Mostly Rigid Scenes", *2017 IEEE Conference on Computer Vision and Pattern Recognition (CVPR)*, May 3, 2017 (pp. 6911-6920).
Extended European Search Report dated Oct. 15, 2019 in counterpart European Application No. 19164881.5 (14 pages in English).

* cited by examiner

EGO MOTION ESTIMATION METHOD AND APPARATUS

CROSS-REFERENCE TO RELATED APPLICATIONS

This application claims the benefit under 35 USC § 119(a) of Korean Patent Application No. 10-2018-0091944 filed on Aug. 7, 2018 in the Korean Intellectual Property Office, the entire disclosure of which is incorporated herein by reference for all purposes.

BACKGROUND

1. Field

The following description relates to estimating ego motion information.

2. Description of Related Art

Devices such as mobile robot, drone, and autonomous vehicle may recognize a relative position of the device itself through an odometry. Since odometry assumes a stationary environment, i.e., an environment free from moving objects other than a camera, a pose estimation may not be accurate when operating in a dynamic environment, for example, an environment in which a moving object other than a camera is present.

For example, pedestrian or other vehicles may be present in a vicinity of an autonomous vehicle that is being driving. As another example, when a service robot is operating, other robots or humans may exist around the service robot. Therefore, devices, such as the autonomous vehicle, may need to distinguish a stationary region from a dynamic region to perform an odometry more accurate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an ego motion estimation method including generating, for an input image segmented into spaces, a scene flow field indicating a scene flow for each of the spaces, clustering the spaces into groups based on the scene flow field, generating a probability vector map for a label of the spaces based on the groups, and estimating ego motion information of an apparatus based on the probability vector map.

The generating of the scene flow field may include calculating, for each of the spaces, a motion vector indicating a two-dimensional (2D) movement and a depth vector indicating a depth-directional movement, and calculating the scene flow based on the motion vector and the depth vector.

The clustering may include forming each of the groups to comprise similar spaces indicating similar scene flows among the similar spaces.

A difference between scene flows of the similar spaces may be less than a threshold.

The ego motion estimation method of claim 1, wherein the clustering may include randomly selecting a number of spaces from the spaces, designating each of the randomly selected spaces to be a reference space, in response to scene flows corresponding to the randomly selected spaces being similar, and classifying the spaces into groups based on the reference space.

The clustering may include randomly reselecting the number of spaces from the spaces, in response to the scene flows corresponding to the randomly selected spaces not being similar.

The classifying may include determining that a space, from among spaces around the reference space, having a scene flow similar to a representative scene flow of the reference space belongs to a group including the reference space.

The representative scene flow may include a mean flow of scene flows in the reference space.

A vector difference of the scene flow of the space from the representative scene flow may be less than a threshold.

The clustering may include matching a label and each of the groups into which the spaces may be clustered.

The estimating may include identifying a stationary background based on the probability vector map, and calculating the ego motion information based on the identified stationary background.

The identifying may include identifying the stationary background from the spaces using a label indicating a highest probability based on the probability vector map.

The ego motion estimation method of claim 1, wherein the generating may include calculating a probability vector map of a current frame based on a clustering of spaces and a probability vector map of a previous frame.

The calculating of the probability vector map of the current frame may include generating a compensated vector map by compensating the probability vector map of the previous frame based on a transformation vector map indicating a movement of each space from the previous frame to the current frame.

The transformation vector map may include a scene flow calculated for the previous frame.

The ego motion estimation method may include acquiring a channel image and a depth image as the input image, wherein the generating may include generating a scene flow field indicating a three-dimensional (3D) scene flow.

The channel image may be a color image comprising any one or any combination of a red channel image, a green channel image, and a blue channel image.

The ego motion estimation method may include segmenting the input image into the plurality of spaces based on a grid pattern.

Each of the spaces may include at least one pixel from among a plurality of pixels in the input image.

The ego motion estimation method may include matching a label corresponding to a stationary background to a stationary space in an initial image acquired when the apparatus may be not moving.

In another general aspect, there is provided an ego motion estimation apparatus including an image sensor configured to acquire an input image, and a processor configured to generate, for an input image segmented into spaces, a scene flow field indicating a scene flow for each of the spaces, cluster the spaces into groups based on the scene flow field, generate a probability vector map for a label of the spaces based on the groups, and estimate ego motion information of an apparatus based on the probability vector map.

In another general aspect, there is provided an ego motion estimation method including generating, for an input image segmented into spaces, a scene flow field indicating a scene flow for each of the spaces, clustering the spaces into groups based on a difference between scene flows of spaces in a group being less than a threshold, generating a probability vector map for a label of the spaces based on the groups, identifying a stationary background based on the probability vector map, and estimating ego motion information of an apparatus based on the stationary background.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will be superfluous in view of the present disclosure.

Figure 1:
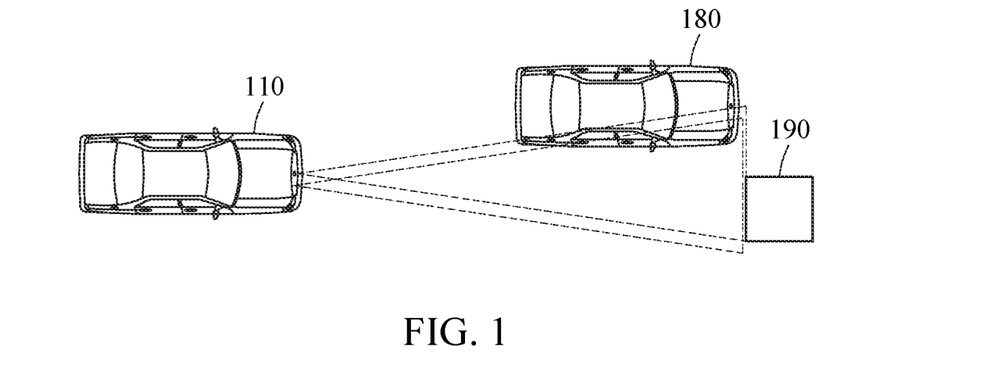
FIG. 1 illustrates an example of an ego motion information estimation apparatus.

FIG. 1 illustrates an example of an ego motion information estimation apparatus.

An ego motion estimation apparatus 110 performs odometry. The odometry may refer to an operation of estimating ego motion information. The ego motion information may be information associated with a motion of the ego motion estimation apparatus 110 and include, for example, a relative movement, coordinates, and a pose of the ego motion estimation apparatus 110. In an example, the odometry may be performed under an assumption of a stationary environment in which all objects are stationary. However, such assumption may cause degradation in position estimation performance of the odometry in an environment having moving objects, such as, for example, vehicles and moving humans. Thus, to robustly estimate a position of a camera in a general dynamic environment, the ego motion estimation apparatus 110 distinguishes different dynamic objects and backgrounds appearing in a field of view (FOV) of the camera.

The ego motion estimation apparatus 110 distinguishes a moving object 180 and a stationary background 190 to accurately perform odometry. For example, the ego motion estimation apparatus 110 estimates the ego motion information using a portion verified as the stationary background 190 in the input image. In an example, the moving object 180 is an object moving in a direction at a speed. The stationary background 190 may be an object, a thing, or a background in a stationary state.

The ego motion estimation apparatus 110 may apply a motion spatial segmentation and a motion temporal segmentation to a scene flow calculated for the input image to distinguish the object and the background appearing in the input image. The ego motion estimation apparatus 110 robustly estimates its own position even when a dynamic object occupies a large portion in the field of view.

FIG. 1 illustrates an example of the ego motion estimation apparatus 110 mounted on a vehicle in operation. Another vehicle corresponding to the moving object 180 and a fixed object corresponding to the stationary background 190 is present in front of the ego motion estimation apparatus 110. In an environment in which the vehicle is driven, the fixed object may be, for example, a street lamp, a traffic light, and a wall. The ego motion estimation apparatus 110 may acquire an input image of surroundings using an image sensor. The ego motion estimation apparatus 110 acquires a color image and a depth image. The ego motion estimation apparatus 110 identifies the stationary background 190 from the input image and accurately estimates the ego motion information based on the stationary background 190. Thus, in terms of an autonomous vehicle, the ego motion estimation apparatus 110 may assist in driving with enhanced safety.

In an example, the ego motion estimation apparatus 110 provides a vehicular augmented reality (AR) to a user based on the accurately estimated ego motion information.

Figure 2:
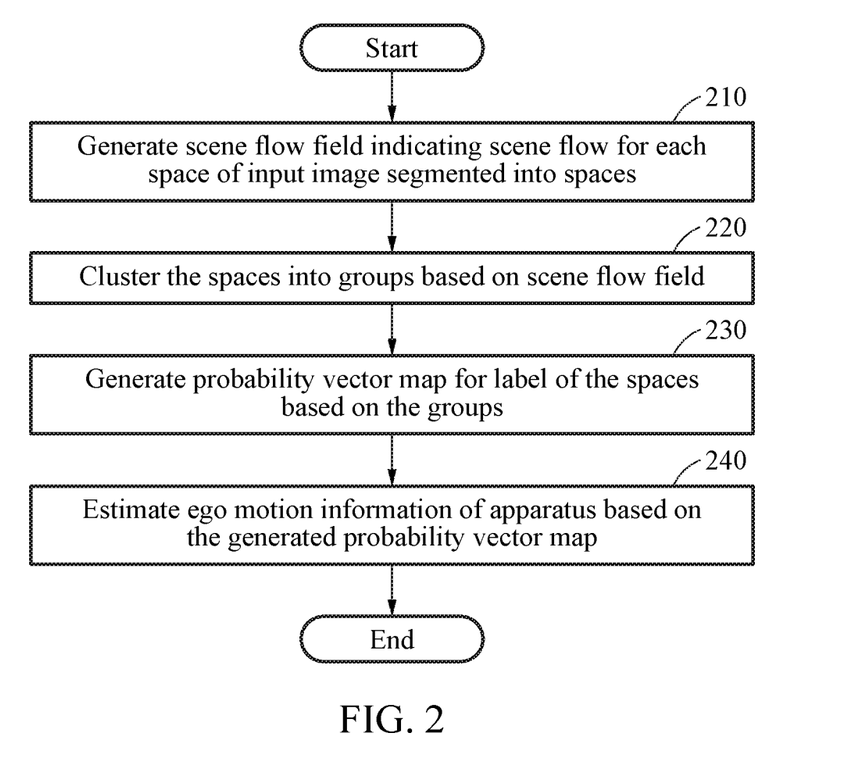
FIG. 2 illustrates an example of an ego motion estimation method.

FIG. 2 illustrates an example of an ego motion estimation method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In operation 210, an ego motion estimation apparatus generates a scene flow field indicating a scene flow for each of the plurality of spaces for an input image that is segmented into a plurality of spaces.

The input image may be an image acquired by an image sensor and segmented into the plurality of spaces. For example, the input image includes spaces segmented based on a grid pattern. Each of the spaces of grids includes at least one pixel. A pattern for segmenting the input image may be designated by a user, but is not be limited thereto.

In an example, the input image includes a channel image and a depth image. The channel image is an image including planar information and includes, for example, a color image. The color image includes a red channel image, a green channel image, and a blue channel image. A pixel included in the color image represents an intensity value of the corresponding color. The depth image is an image including depth information and is acquired based on methods such as, for example, a time of flight (ToF) method and a structured light method. The following description is based on an example in which an input image includes three color channel images and one depth image. However, other number and types of color channel images and depth image are considered to be well within the scope of the present disclosure.

In an example, a scene flow is a vector indicating a three-dimensional (3D) displacement and a 3D direction in which a portion of an image moves. For example, a scene flow calculated for one space of the input image with respect to a time frame may indicate a 3D movement of the corresponding space from the corresponding time frame to a subsequent time frame. The scene flow is generated based on a motion vector indicating a two-dimensional (2D) movement of the corresponding space and a depth vector indicating a depth-directional movement from the corresponding time frame to a subsequent time frame. For example, the ego motion estimation apparatus determines the scene flow by concatenating the motion vector and the depth vector.

The scene flow field is a set of scene flows. For example, the scene flow field may be a set of scene flows calculated for each of the plurality of spaces of the input image.

In operation 220, the ego motion estimation apparatus clusters the plurality of spaces into a plurality of groups based on the scene flow field. For example, the ego motion estimation apparatus clusters the plurality of spaces such that spaces having similar motions are formed into a group. Each of the groups is labeled as a stationary background or a dynamic object. A group labeled as the dynamic object may be a rigid body since spaces having similar motions in the input image are clustered. A clustering operation will be further described with reference to FIG. 6.

In operation 230, the ego motion estimation apparatus generates a probability vector map for a label of the plurality of spaces based on the plurality of groups. The probability vector map is a map of probability vectors mapped to spaces into which the input image is segmented. A probability vector mapped to a space may indicate a probability of the space belonging to each label. When m labels are provided, the probability vector may indicate a probability of the space belonging to each of the m labels. The probability vector map will be further described with reference to FIG. 8.

In operation 240, the ego motion estimation apparatus estimates ego motion information of an apparatus based on the generated probability vector map. In an example, the ego motion estimation apparatus estimates the ego motion information based on a stationary background.

For example, the input image is segmented into n spaces, n being an integer greater than or equal to 1. The scene flow field includes a scene flow of each of the n spaces. A group label includes label indicating a group to which each of the n spaces belongs. The probability map includes a probability vector of each of the n spaces.

Figure 3:
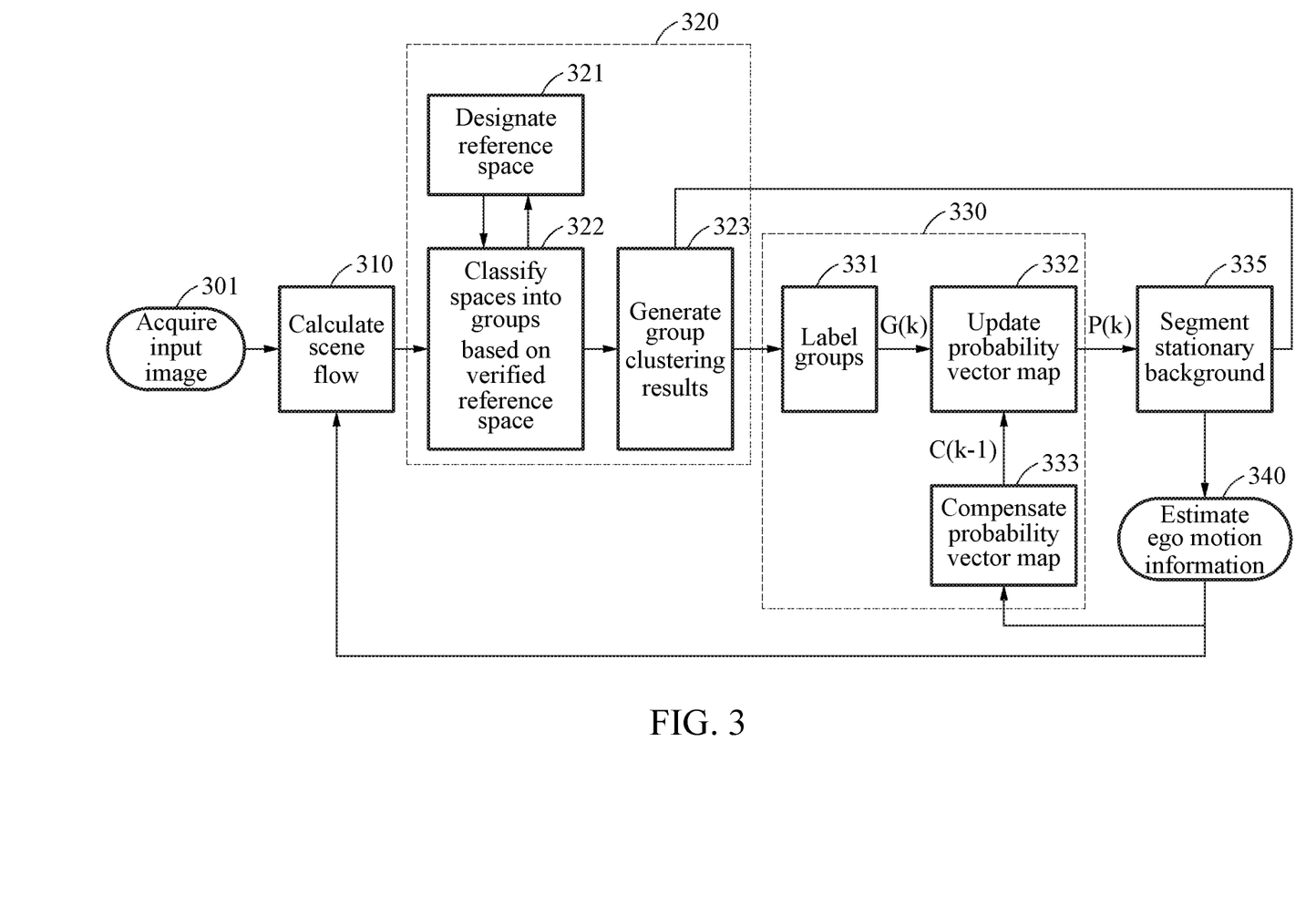
FIG. 3 illustrates an example of a process of estimating ego motion information.

FIG. 3 illustrates an example of a process of estimating ego motion information. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 301, an ego motion estimation apparatus acquires an input image. The ego motion estimation apparatus acquires an RGB-D image as an input image. The RGB-D image refers to a pair of an RGB image and a depth image.

In operation 310, the ego motion estimation apparatus calculates a scene flow. The ego motion estimation apparatus calculates a motion vector, for example, a 2D optical flow, indicating a movement on a 2D plane and a depth vector indicating a depth-directional movement for each of a plurality of spaces of an input image. In an example, the ego motion estimation apparatus determines the scene flow by concatenating the motion vector and the depth vector. Also, the ego motion estimation apparatus may calculate a 3D optical flow as the scene flow for each of the plurality of spaces of the input image.

In operation 320, the ego motion estimation apparatus performs a motion spatial segmentation. The ego motion estimation apparatus clusters the plurality of spaces based on the scene flow. The ego motion estimation apparatus forms each of the plurality of groups to include spaces indicating similar scene flows among the plurality of spaces. The ego motion estimation apparatus designates a reference space in operation 321, classifies the plurality of spaces into groups based on a verified reference space in operation 322, and generate group clustering results in operation 323. Thus, the ego motion estimation apparatus determines a rigid body to which each of 3D scene flows estimated for a 3D space belongs. The clustering operation will also be further described with reference to FIG. 6.

Since the clustering results are calculated without consideration of a time frame, an object determined as a rigid body having a label A in a previous time frame may be determined as a rigid body having a label B instead of label A in a subsequent time frame. Thus, an operation for maintaining a consistency of a label of a rigid body may be performed.

To maintain a consistency of a label of a rigid body, the ego motion estimation apparatus performs a motion temporal segmentation in operation 330. The ego motion estimation apparatus labels each of the clustered results in operation 331, compensates the probability vector map in operation 333, and updates the probability vector map in operation 332. G(k) denotes a group label labeled for each space in a kth time frame. C(k−1) denotes a map obtained by compensating a probability vector map of a (k−1)$^{th}$ time frame for a camera movement. P(k) denotes the probability vector map of the kth time frame. An update of such probability vector map will be further described with reference to FIG. 9.

In operation 335, the ego motion estimation apparatus segments a stationary background. The ego motion estimation apparatus identify a space corresponding to the stationary background from the spaces of the input image based on the probability vector map P(k) of the kth time frame. The ego motion estimation apparatus identifies the stationary background based on the probability vector map.

In operation 340, the ego motion estimation apparatus estimates ego motion information. The ego motion estimation apparatus calculates the ego motion information indicating the camera movement based on the identified stationary background.

Figure 4:
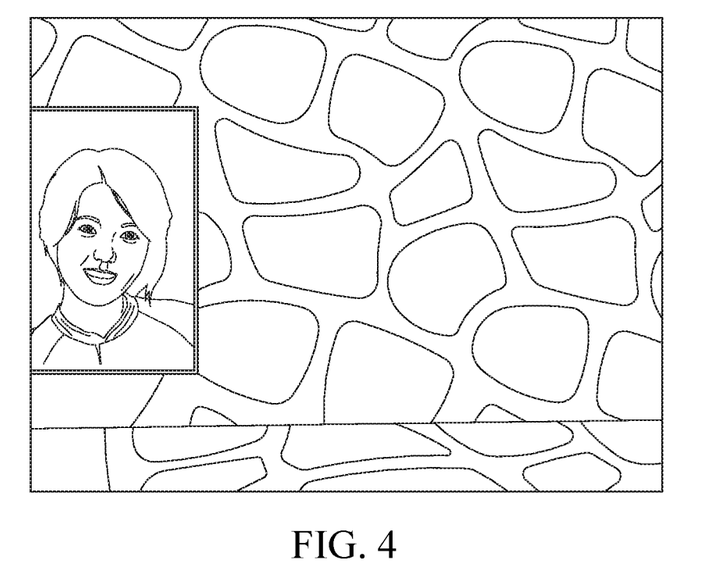
FIG. 4 illustrates an example of an input image.

FIG. 4 illustrates an example of an input image.

An input image 400 may be a channel image as described above. An image sensor of the ego motion estimation apparatus generates the input image 400 by capturing an external scene. Also, the ego motion estimation apparatus consecutively captures the input image 400 for each time frame. The input image 400 is segmented into a plurality of spaces. For each of the plurality of spaces, a scene flow is estimated as described with reference to FIG. 5.

Figure 5:
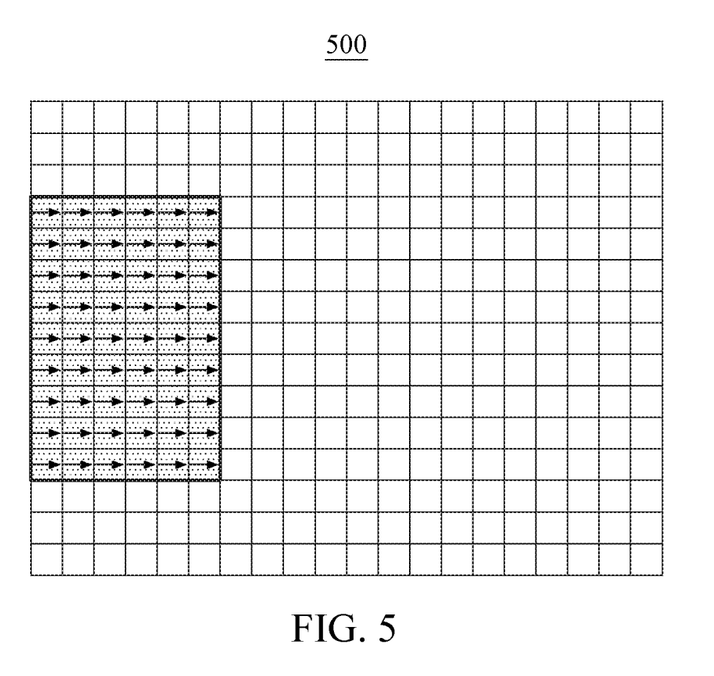
FIG. 5 illustrates an example of a scene flow field.

FIG. 5 illustrates an example of a scene flow field.

A scene flow field 500 is a set of scene flows estimated for each space of an input image. Each of the scene flow includes a motion vector indicating a 2D movement and a depth vector indicating a depth-directional movement. The motion vector is, for example, an optical flow. In an example, an ego motion estimation apparatus calculates an optical flow as a motion vector for each of a plurality of spaces using a Lucas-Kanade method. The ego motion estimation apparatus may estimate a space-wise motion based on the optical flow, but embodiments are not limited thereto. The ego motion estimation apparatus may also estimate a pixel-wise motion. FIG. 5 illustrates the scene flow field 500 obtained by estimating a scene flow for each space of the input image of FIG. 4. A moving object, for example, a picture, appearing in the input image of FIG. 4 indicates a rightward movement. Although FIG. 5 illustrates the scene flow based on a 2D moving direction, the scene flow may also include a 3D moving direction and a 3D moving amount of the corresponding space.

In an example, the ego motion estimation apparatus uses a planar channel image and a depth image to estimate a 3D velocity for each space.

Figure 6:
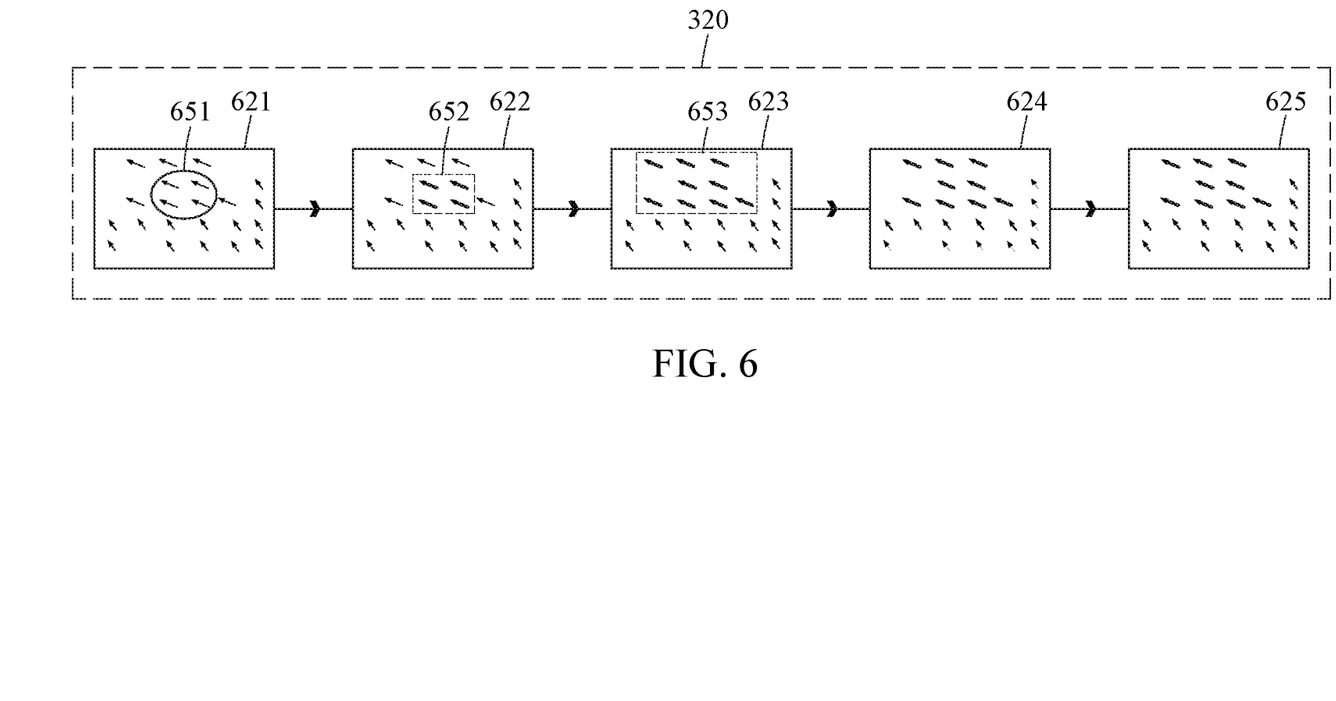
FIG. 6 illustrates an example of a clustering operation.

FIG. 6 illustrates an example of a clustering operation.

As described with reference to FIG. 3, in operation 320, the ego motion estimation apparatus clusters a plurality of spaces of the input image into a plurality of groups based on a scene flow field calculated for each of the plurality of spaces. The ego motion estimation apparatus forms each of the plurality of groups to include spaces indicating similar scene flows among the plurality of spaces. The ego motion estimation apparatus determines the plurality of spaces to be one of the plurality of groups such that a difference between scene flows of spaces included in each of the plurality of groups is less than a threshold. The difference between the scene flows may be a Euclidean distance, but is not limited thereto.

In operation 621, the ego motion estimation apparatus randomly selects a number of spaces 651 from the plurality of spaces. The number of spaces 651 may be designated by a user, but embodiments are not limited thereto. The number of spaces 651 may vary depending on a design.

In operation 622, the ego motion estimation apparatus designates each of the randomly selected spaces 651 to be a reference space 652 when scene flows corresponding to the randomly selected spaces 651 is similar. For example, the ego motion estimation apparatus determines the selected spaces 651 to be the reference space 652 when a difference between randomly selected scene flows is less than a threshold difference.

When the scene flows corresponding to the randomly selected spaces 651 is not similar, the ego motion estimation apparatus randomly reselects a preset number of spaces from the plurality of spaces. For example, the ego motion estimation apparatus reselects spaces when a difference between the scene flows of the selected spaces 651 is greater than or equal to the threshold difference.

In operation 623, the ego motion estimation apparatus classifies the plurality of spaces into a plurality of groups based on the reference space. In an example, the ego motion estimation apparatus determines that a space having a scene flow similar to a representative scene flow of the reference space among spaces around the reference space belongs to a group 653 including the reference space. The representative scene flow of the reference space may be a mean flow of scene flows in the reference spaces, but is not limited thereto. The ego motion estimation apparatus adds a space having a scene flow of which a vector difference from the representative scene flow is less than a threshold among the spaces around the reference space, to the group 653 including the reference space.

In operation 624, the ego motion estimation apparatus repetitively performs operations 621 through 623 on remaining unclustered spaces. The ego motion estimation apparatus performs, on the remaining space, an operation of randomly selecting the reference space and an operation of expanding the corresponding group based on the reference space.

In operation 625, the ego motion estimation apparatus generates a clustering result in which groups are designated for all the spaces.

Figure 7:
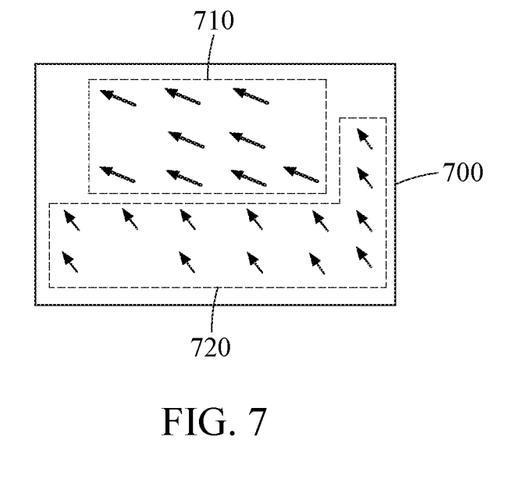
FIG. 7 illustrates an example of a labeling operation.

FIG. 7 illustrates an example of a labeling operation.

An ego motion estimation apparatus determines a label for a plurality of spaces on which clustering is completed. The ego motion estimation apparatus matches the label to each group into which the plurality of spaces is clustered.

FIG. 7 illustrates a result in which a scene flow field 700 is classified into spaces belonging to a first group 710 and spaces belonging to a second group 720. The ego motion estimation apparatus matches the first group 710 and a first label, and matches the second group 720 and a second label. When the first group 710 indicates the first label in a previous time frame, the ego motion estimation apparatus matches the first group 710 and the first label in a current time frame. As such, the ego motion estimation apparatus performs a labeling operation on consecutive frame images such that a label matching each space has a continuity.

In an initial image acquired while an apparatus is stopped, the ego motion estimation apparatus matches a label corresponding to a stationary background and a stationary space. The ego motion estimation apparatus identifies the stationary background in advance during an initial operation. The ego motion estimation apparatus matches a label of a current time frame to a space based on a label of the previous time frame, thereby designating a consistent label for a space moving based on a scene flow.

Figure 8:
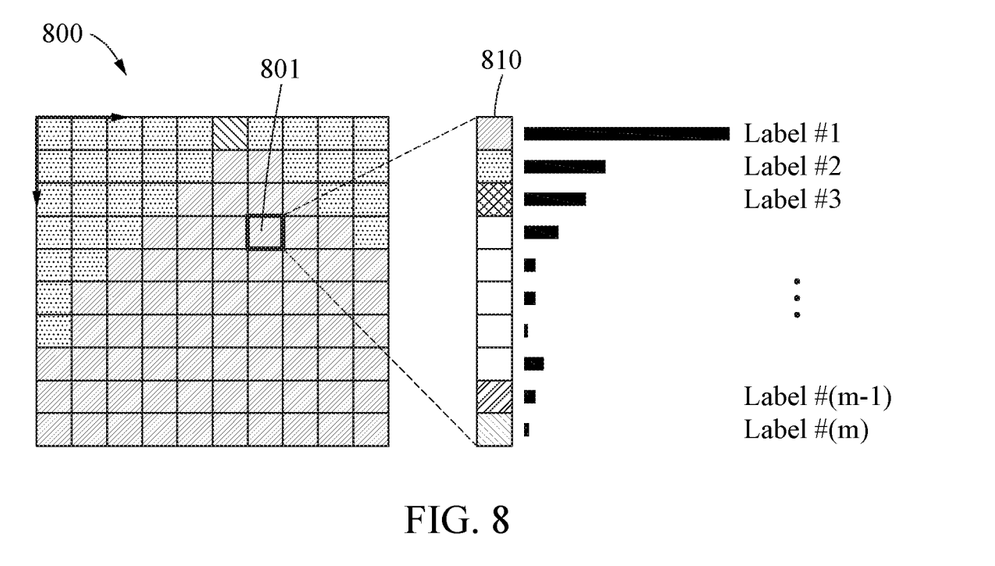
FIG. 8 illustrates an example of a probability vector map.

FIG. 8 illustrates an example of a probability vector map.

A probability vector map 800 is a map including a plurality of probability vectors. The probability vector map 800 includes spaces arranged in the same number and dimension as a plurality of spaces of an input image. Each of the plurality of probability vectors is assigned to each of the spaces of the probability vector map 800.

A probability vector 810 indicates a probability of a space belonging to each label. For example, the probability vector 810 indicates a probability that a space mapped to the probability vector 810 belongs to each of m labels. Here, m is an integer greater than or equal to 1, and may be a maximum number to be observed by an ego motion estimation apparatus. When the probability vector 810 indicates that a probability of the space belonging to $i^{th}$ label, the ego motion estimation apparatus determines that the space indicating an $i^{th}$ object. Here, i is an integer between 1 and m. m may be determined by a user, but is not limited thereto.

In the probability vector map 800, the probability vector 810 of a space 801 has a highest probability with respect to a label #1. The ego motion estimation apparatus determines that the space 801 indicates an object corresponding to the label #1 based on the probability vector map 800.

The ego motion estimation apparatus identifies a stationary background from a plurality of spaces using a label indicating a highest probability based on the probability vector map 800. For example, the ego motion estimation apparatus designates a label indicating the highest label for each space and identify a space corresponding to the label indicating the stationary background as the stationary background.

Figure 9:
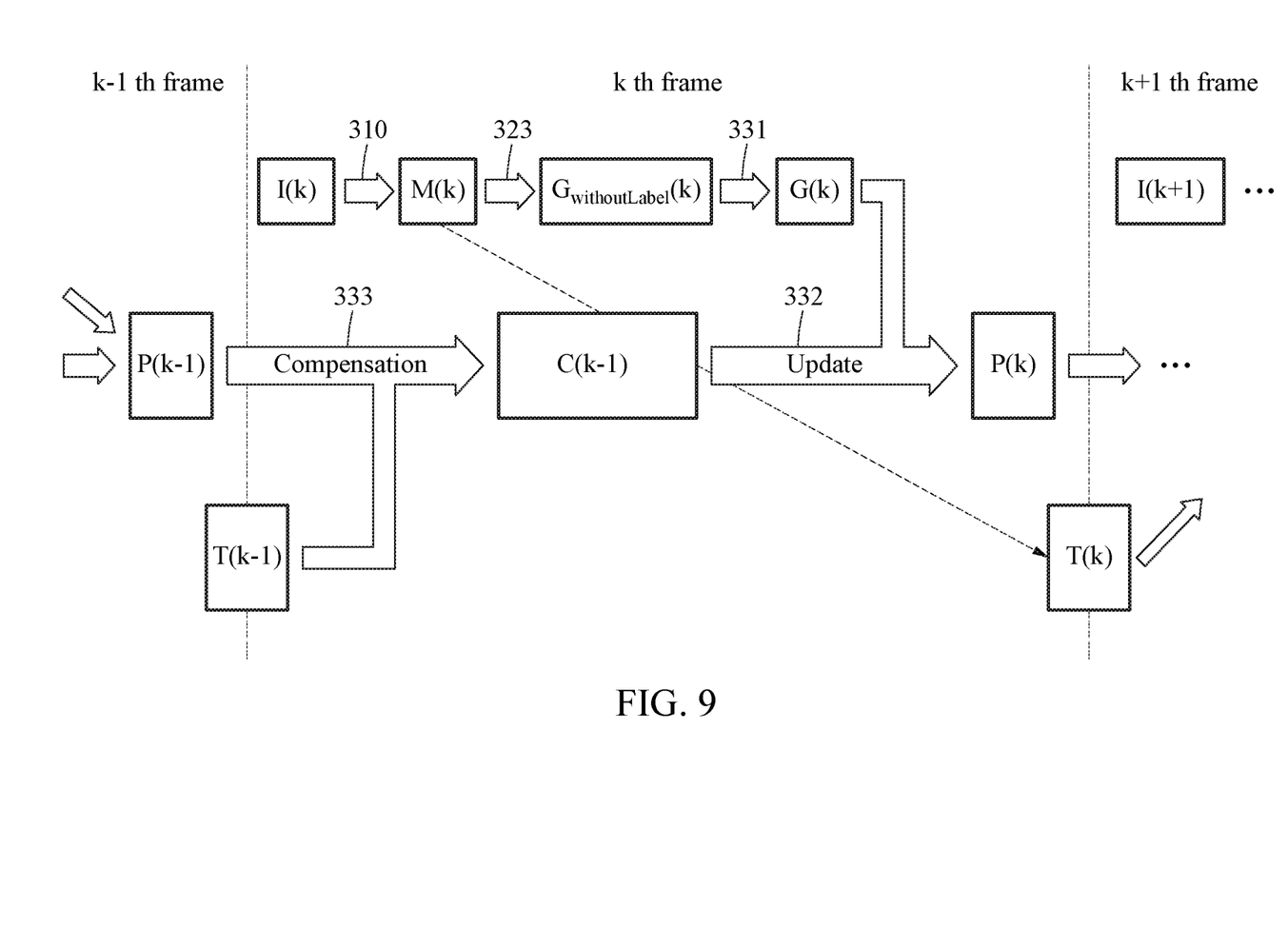
FIG. 9 illustrates an example of updating a probability vector map.

FIG. 9 illustrates an example of updating a probability vector map.

An ego motion estimation apparatus updates a probability vector map for each time frame. The ego motion estimation apparatus calculates a probability vector map for a current frame based on a probability vector map of a previous frame and a clustering result a plurality of spaces. For example, the ego motion estimation apparatus updates a probability vector map for a kth frame.

In operation 310, the ego motion estimation apparatus calculates a scene flow field M(k) from an input image I(k) acquired for the $K^{th}$ frame. In operation 323, the ego motion estimation apparatus generates a clustering result $G_{withoutLabel}(k)$ based on the scene flow field M(k). In operation 331, the ego motion estimation apparatus matches the clustering result $G_{withoutLabel}(k)$ and a label, thereby calculating a labeled group G(k).

In operation 333, the ego motion estimation apparatus generates a compensated vector map C(k−1) by compensating a probability vector map P(k−1) of a previous frame based on a transformation vector map T(k−1) indicating a movement of each space from the previous frame to a current frame. The ego motion estimation apparatus moves or adjusts a vector assigned to each space of the probability vector map P(k−1) of the previous frame based on the transformation vector map T(k−1).

In an example, the transformation vector map T(k−1) is a map obtained by mapping a transformation vector to each of the plurality of spaces. The transformation vector is a vector indicating a direction and a distance to which a space is to be moved by moving a camera and moving a target object. In an example, the ego motion estimation apparatus determines a scene flow M(k−1) calculated for the previous frame to be the transformation vector map T(k−1), but embodiments are not limited thereto. For example, the transformation vector map T(k−1) may be generated by performing feature matching between spaces of a previous frame image and spaces of a current frame images.

In operation 332, the ego motion estimation apparatus calculates a probability vector map P(k) for the current frame based on the clustering result, for example, the labeled group G(k) of the plurality of spaces and the compensated vector map C(k−1). For example, the ego motion estimation apparatus determines an average of the compensated vector map C(k−1) and a label of each of the spaces in the labeled group G(k) to be the probability vector map P(k) of the current frame. In the labeled group G(k), a vector assigned to each of the spaces may be a vector of which a probability with respect to a label among a plurality of labels is a maximum value of 1 and probabilities with respect to remaining labels are set to zero. For example, when a vector assigned to one space of the compensated vector map C(k−1) is [0.5, 0.4, 0.1], and a vector assigned to a corresponding space in the labeled group G(k) is [1, 0, 0], a vector calculated for the corresponding space in the probability vector map P(k) for the current frame is [0.75, 0.2, 0.05]. However, this is merely an example for ease and convenience of description, and is not to be taken as being limited thereto.

The ego motion estimation apparatus may continuously update the probability vector map by repetitively performing the aforementioned operations for each frame.

Figure 10:
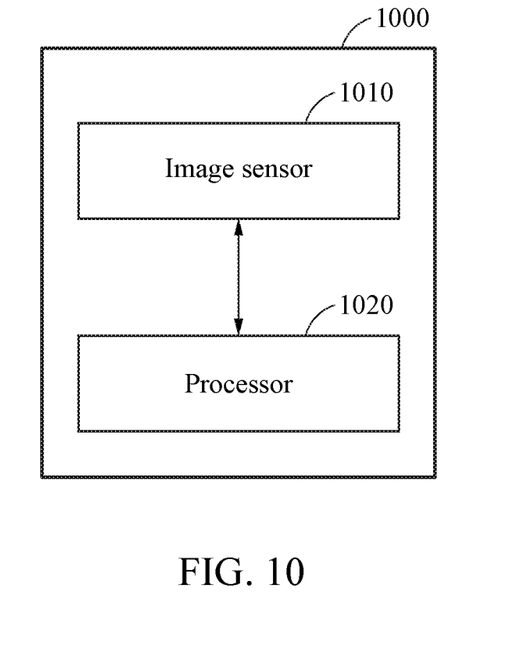
FIG. 10 illustrates an example of an ego motion estimation apparatus.

FIG. 10 illustrates an example of an ego motion estimation apparatus.

An ego motion estimation apparatus 1000 includes an image sensor 1010, a processor 1020, and a display 1030.

The image sensor 1010 acquires an input image. In an example, the image sensor 1010 includes, for example, a color sensor and a depth sensor. In an example, the image sensor 1010 acquires a channel image and a depth image as the input image.

In an example, the processor 1020 classifies the input image into a plurality of spaces. For example, the processor 1020 segments the input image into the plurality of spaces based on a grid pattern. In an example, the processor 1020 forms the plurality of spaces to include at least one pixel among a plurality of pixels in the input image.

In an example, the processor 1020 generates a scene flow field indicating a scene flow for each of the plurality of spaces. For example, the processor 1020 generates a scene flow field of a scene flow indicating a 3D movement.

In an example, the processor 1020 clusters the plurality of spaces into a plurality of groups based on the scene flow field. In an example, the processor 1020 generates a probability vector map for a label of the plurality of spaces based on the plurality of groups. In an example, the processor 1020 estimates ego motion information of an apparatus based on the generated probability vector map.

The ego motion estimation apparatus 1000 may be implemented as a real-time image odometry based on a motion segmentation robust to a dynamic environment. The ego motion estimation apparatus 1000 may be embodied or provided in an ECU or the VCU of a vehicle, a personal computer (PC), a data server, or a portable electronic device. The portable electronic device described herein refers to any devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, or other consumer electronics/information technology(CE/IT) device. Also, the ego motion estimation apparatus 1000 may be directly applied to real-time position estimation and control technology for a vehicle.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, and a drone.

The ego motion estimation apparatus 1000 robustly estimates its own position in an environment including dynamic objects, for example, a pedestrian and a vehicle. Furthermore, the ego motion estimation apparatus 1000 may be applied to, for example, an unmanned space exploration robot, an air vehicle, and a vehicle as a method of overcoming a limit of an image-based navigation which is a core of indoor unmanned technology. The ego motion estimation apparatus 1000 may use only a camera sensor and thus, may be applied to a platform without restrictions.

The ego motion estimation apparatus 1000 may distinguish a plurality of objects, have no constraints on a moving object, and separate the moving object from a stationary background without using prior information. Furthermore, the ego motion estimation apparatus 1000 may have a low computational load.

The ego motion estimation apparatus 110 and 1000, and other apparatuses, units, modules, devices, components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card, or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An ego motion estimation method comprising:
generating, for an input image segmented into spaces, a scene flow field indicating a scene flow for each of the spaces;
clustering the spaces into groups based on the scene flow field;
generating a probability vector map for a label of the spaces based on the groups; and
estimating ego motion information of an apparatus based on the probability vector map.

2. The ego motion estimation method of claim 1, wherein the generating of the scene flow field comprises:
calculating, for each of the spaces, a motion vector indicating a two-dimensional (2D) movement and a depth vector indicating a depth-directional movement; and
calculating the scene flow based on the motion vector and the depth vector.

3. The ego motion estimation method of claim 1, wherein the clustering comprises forming each of the groups to comprise similar spaces indicating similar scene flows among the similar spaces.

4. The ego motion estimation method of claim 3, wherein a difference between scene flows of the similar spaces is less than a threshold.

5. The ego motion estimation method of claim 1, wherein the clustering comprises:
randomly selecting a number of spaces from the spaces;
designating each of the randomly selected spaces to be a reference space, in response to scene flows corresponding to the randomly selected spaces being similar; and
classifying the spaces into groups based on the reference space.

6. The ego motion estimation method of claim 5, wherein the clustering comprises randomly reselecting the number of spaces from the spaces, in response to the scene flows corresponding to the randomly selected spaces not being similar.

7. The ego motion estimation method of claim 5, wherein the classifying comprises determining that a space, from among spaces around the reference space, having a scene flow similar to a representative scene flow of the reference space belongs to a group including the reference space.

8. The ego motion estimation method of claim 7, wherein the representative scene flow comprises a mean flow of scene flows in the reference space.

9. The ego motion estimation method of claim 8, wherein a vector difference of the scene flow of the space from the representative scene flow is less than a threshold.

10. The ego motion estimation method of claim 1, wherein the clustering comprises matching a label and each of the groups into which the spaces is clustered.

11. The ego motion estimation method of claim 1, wherein the estimating comprises:
identifying a stationary background based on the probability vector map; and
calculating the ego motion information based on the identified stationary background.

12. The ego motion estimation method of claim 11, wherein the identifying comprises identifying the stationary background from the spaces using a label indicating a highest probability based on the probability vector map.

13. The ego motion estimation method of claim 1, wherein the generating comprises calculating a probability vector map of a current frame based on a clustering of spaces and a probability vector map of a previous frame.

14. The ego motion estimation method of claim 13, wherein the calculating of the probability vector map of the current frame comprises:
generating a compensated vector map by compensating the probability vector map of the previous frame based on a transformation vector map indicating a movement of each space from the previous frame to the current frame.

15. The ego motion estimation method of claim 14, wherein the transformation vector map comprises a scene flow calculated for the previous frame.

16. The ego motion estimation method of claim 1, further comprising:
acquiring a channel image and a depth image as the input image, wherein the generating comprises generating a scene flow field indicating a three-dimensional (3D) scene flow.

17. The ego motion estimation method of claim 16, wherein the channel image is a color image comprising any one or any combination of a red channel image, a green channel image, and a blue channel image.

18. The ego motion estimation method of claim 1, further comprising:
segmenting the input image into the plurality of spaces based on a grid pattern.

19. The ego motion estimation method of claim 1, wherein each of the spaces comprises at least one pixel from among a plurality of pixels in the input image.

20. The ego motion estimation method of claim 1, further comprising:
matching a label corresponding to a stationary background to a stationary space in an initial image acquired when the apparatus is not moving.

21. A non-transitory computer-readable storage medium storing instructions that, when executed by a processor, cause the processor to perform the method of claim 1.

22. An ego motion estimation apparatus comprising:
an image sensor configured to acquire an input image; and
a processor configured to generate, for an input image segmented into spaces, a scene flow field indicating a scene flow for each of the spaces, cluster the spaces into groups based on the scene flow field, generate a probability vector map for a label of the spaces based on the groups, and estimate ego motion information of an apparatus based on the probability vector map.

23. An ego motion estimation method comprising:
generating, for an input image segmented into spaces, a scene flow field indicating a scene flow for each of the spaces;
clustering the spaces into groups based on a difference between scene flows of spaces in a group being less than a threshold;
generating a probability vector map for a label of the spaces based on the groups;
identifying a stationary background based on the probability vector map; and
estimating ego motion information of an apparatus based on the stationary background.

* * * * *